No. 889,057. PATENTED MAY 26, 1908.
F. N. STEELE.
DISK HARROW TRUCK.
APPLICATION FILED JULY 10, 1907.

2 SHEETS—SHEET 1.

Witnesses
Chas. D. Swett
Charles P. Swett

Inventor
Frederick N. Steele,
By Thomas P. Simpson.
Attorney

No. 889,057. PATENTED MAY 26, 1908.
F. N. STEELE.
DISK HARROW TRUCK.
APPLICATION FILED JULY 10, 1907.
2 SHEETS—SHEET 2.
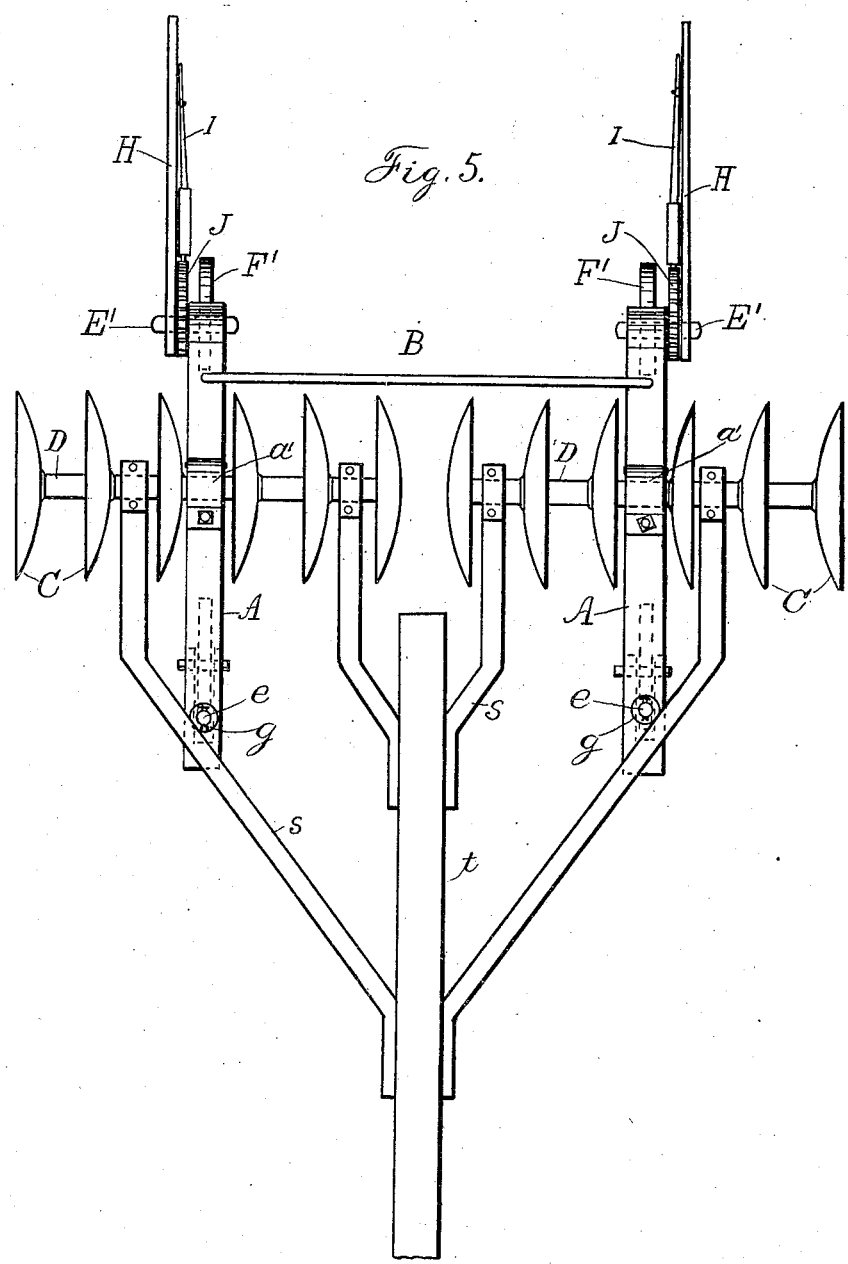

UNITED STATES PATENT OFFICE.

FREDERICK N. STEELE, OF OTTAWA, KANSAS.

DISK-HARROW TRUCK.

No. 889,057.  Specification of Letters Patent.  Patented May 26, 1908.

Application filed July 10, 1907. Serial No. 383,084.

*To all whom it may concern:*

Be it known that I, FREDERICK N. STEELE, citizen of the United States, residing as Ottawa, in the county of Franklin and State of Kansas, have invented certain new and useful Improvements in Disk-Harrow Trucks, of which the following is a specification.

The object of this invention is to provide means by which an ordinary disk harrow may be easily transported along a road, or other pass-way, without injury to the disks. It may be adjusted to coöperate with the harrow when the latter is in operation, or it may be wholly detached from the harrow.

The accompanying drawings illustrate the invention, its various parts being referred to by letters; similar letters denoting corresponding parts in the several views.

Figure 1:
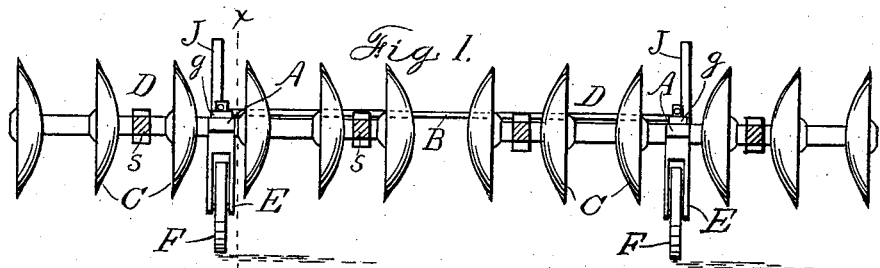
Figure 2:
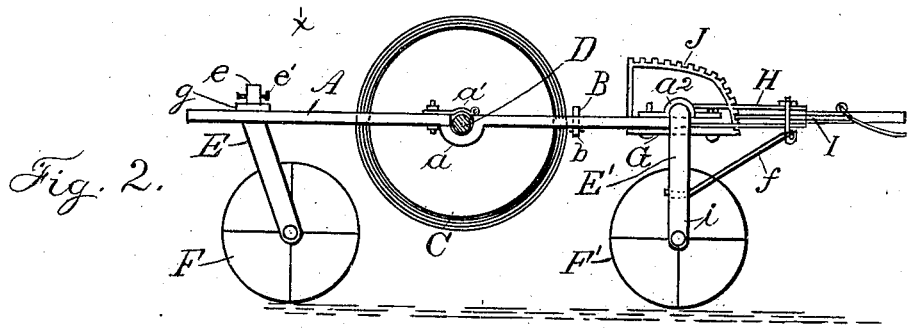
Figure 3:
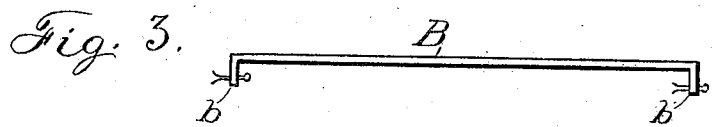
Figure 4:
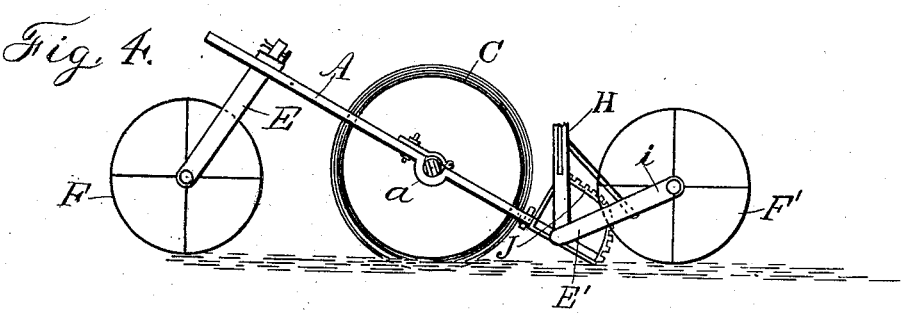

In the drawing Figure 1 is a front elevation of the truck, with a disk harrow thereon. Fig. 2 is a side elevation taken on line $x$—$x$ of Fig. 1, with the harrow raised for transportation. Fig. 3 is the cross rod connecting the two sections of the truck. Fig. 4 is a side elevation of the device, with the rear end of the side bar lowered, and Fig. 5 is a plan view of the entire machine, in connection with a harrow.

The letters A, A, designate the side bars of the truck. Each of these bars is provided, intermediate of its ends, with a boxing, formed of a downwardly curved portion $a$, of the bar, and an upwardly curved, hinged cover, $a'$ thereon. The shaft D of the harrow has bearings in these boxes.

The front end of each bar A, is carried by a caster-like wheel F, swiveled on the bar; an end $e$ being passed up through the bar and detachably held there by a key $e'$. A washer $g$ is preferably interposed between the key and the bar.

The rear end of each bar A is carried on a U shaped crank axle E', in the forks $i$, $i$ of which, is journaled the traveling wheel F'. A lever H is fixed on the axle E' and is braced thereon by a rod $f$, extending between said lever and a prong of the crank axle. The lever H is provided with a pawl I, adapted to engage a ratchet J, on the bar A. B is a cross rod, connecting the bars A, A, rearwardly of the harrow disks C, C; its ends $b$, $b$, passing down through bars A, and being held there by cross pins. $s$ and $t$ designate respectively the ordinary hounds and tongue of a harrow.

To load the harrow upon the truck, remove the front wheels from the truck, open the box cover $a'$, raise the lever H, push the arms A under the disk shaft D from the rear, until the shaft D is directly above the box $a$. Raise the front ends of bars A and attach the front wheels catching the shaft D in the open boxing, upon which the cover is then placed, then bring the lever H to a horizontal position.

To unload the harrow, reverse the operation just described; but if the disks are large enough to enter the ground sufficiently, after lowering the rear ends of bars A, as shown in Fig. 4, the harrow and truck may be used together, in that relative position; but usually it is necessary to remove the truck entirely, from the harrow, leaving the latter to follow the draft alone.

What I claim and desire to secure is,—

A disk harrow truck comprising two side bars, each bar provided with a boxing near its middle part formed of a downwardly curved portion of said bar, and an upwardly curved cover thereon, a front wheel on each of said bars whose support has a reduced end rotatable in said bar, a retaining pin in said end removable therefrom, a washer between said pin and said bar, a U shaped crank axle journaled on the rear end of each of said bars, a traveling wheel journaled in the prongs of said axle, a lever fixed on said axle, a brace connecting said lever and one of said prongs, a pawl on said lever, a ratchet on said bar adapted to be engaged by said pawl, a cross-rod connecting said side bars, rearwardly of said harrow disks and means to secure said rod to said side bars, as described.

In testimony whereof I affix my signature in presence of two witnesses.

FREDERICK N. STEELE.

Witnesses:
GEORGE E. LONG,
GRACE M. STEELE.